United States Patent
Murase et al.

(10) Patent No.: US 6,470,392 B1
(45) Date of Patent: Oct. 22, 2002

(54) APPARATUS FOR AND A METHOD OF CREATING AND CONVEYING AN INTERACTIVE AUDIOVISUAL WORK

(75) Inventors: Yotaro Murase, #701, Park Green, 120 Irigaike, Nagakutecho, Aichigun, Kanagawa-ken (JP); Hidematsu Kasano, Kanagawa-ken (JP)

(73) Assignee: Yotaro Murase, Aichi-ken (JP)

( * ) Notice: Subject to any disclaimer, the term of this patent is extended or adjusted under 35 U.S.C. 154(b) by 0 days.

(21) Appl. No.: 09/335,634

(22) Filed: Jun. 18, 1999

(30) Foreign Application Priority Data

Jun. 19, 1998 (JP) .......................................... 10-172701

(51) Int. Cl.⁷ .............................................. G06F 15/16
(52) U.S. Cl. ...................... 709/231; 709/232; 709/236
(58) Field of Search ................................ 345/302, 435, 345/473, 121, 328; 709/231, 232, 236

(56) References Cited

U.S. PATENT DOCUMENTS

| | | | |
|---|---|---|---|
| 5,237,648 A | * 8/1993 | Mills et al. .................. 345/474 |
| 5,359,712 A | * 10/1994 | Cohen et al. ............... 345/723 |
| 5,404,444 A | * 4/1995 | Billings ....................... 345/839 |
| 5,453,013 A | * 9/1995 | Billings et al. .............. 434/169 |
| 5,553,864 A | * 9/1996 | Sitrick ......................... 463/31 |
| 5,692,212 A | 11/1997 | Roach |
| 5,830,065 A | * 11/1998 | Sitrick ......................... 463/31 |
| 5,850,352 A | * 12/1998 | Moezzi et al. ............... 345/419 |
| 5,953,506 A | * 9/1999 | Kalra et al. ................. 345/428 |
| 6,138,163 A | * 10/2000 | Nam et al. ................... 709/203 |
| 6,141,693 A | * 10/2000 | Perlman et al. ............. 348/180 |
| 6,157,391 A | * 12/2000 | Johnson ....................... 345/473 |
| 6,205,525 B1 | * 3/2001 | Korst .......................... 709/231 |
| 6,219,730 B1 | * 4/2001 | Nguyen ....................... 341/50 |
| 6,320,588 B1 | * 11/2001 | Palmer et al. ............... 345/473 |
| 6,356,947 B1 | * 3/2002 | Lutterschmidt ............. 709/231 |

FOREIGN PATENT DOCUMENTS

JP 07-079399 3/1995

OTHER PUBLICATIONS

Fujiwara, H. "DVD and Video CD", 1996.4.11., pp. 152–153, 232, 234, ASCII, Japan.
Fujiwara, H. & Okubo, S. Image Compression Technique in Internet Era, pp. 54–59. 1996.8.1., ASCII, Japan.
Kasamo, H. Communication Protocol Dictionary, 1996.11.11, pp. 600–601, 602–603, 627, ASCII, Japan.
Arita, K. "World of Digital SFX", 1996.2.28, pp. 328–333, 350–351, Nikkei BP, Japan.

* cited by examiner

Primary Examiner—Krisna Lim
(74) Attorney, Agent, or Firm—Anderson Kill & Olick; Eugene Lieberstein; Michael N. Meller

(57) ABSTRACT

An apparatus for and a method of creating and conveying an interactive audiovisual work are disclosed. An interactive audiovisual work is divided into streams of video data. Associated Table which stores relationship between streams is provided to select a next stream in response to user input. A next stream is selected from the Associated Table so that a precedent stream and a next stream have substantially the same scene at connection in order to connect streams seamlessly and naturally. Timing signal for starting the retrieval of a next stream is provided so as to fetch and convey a next stream quickly without any intermission of display. An interactive audiovisual work is created by matching scenes at the connection of streams.

5 Claims, 11 Drawing Sheets

FIG. 3

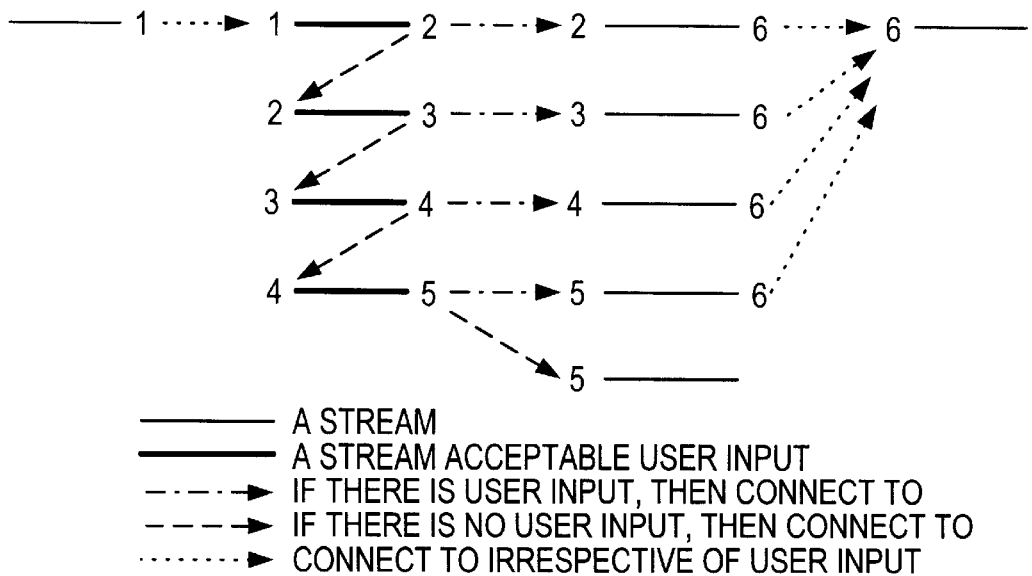

———— A STREAM
━━━━ A STREAM ACCEPTABLE USER INPUT
–·–·▶ IF THERE IS USER INPUT, THEN CONNECT TO
– – –▶ IF THERE IS NO USER INPUT, THEN CONNECT TO
·······▶ CONNECT TO IRRESPECTIVE OF USER INPUT

NUMERALS AT THE END OF THE SECTIONS REPRESENT STARTING AND ENDING SCENES OF THE STREAMS REPRESENTED BY THE SECTIONS. THE SAME NUMERAL MEANS THE SAME OR SUBSTANTIALLY THE SAME SCENE.

FIG. 4

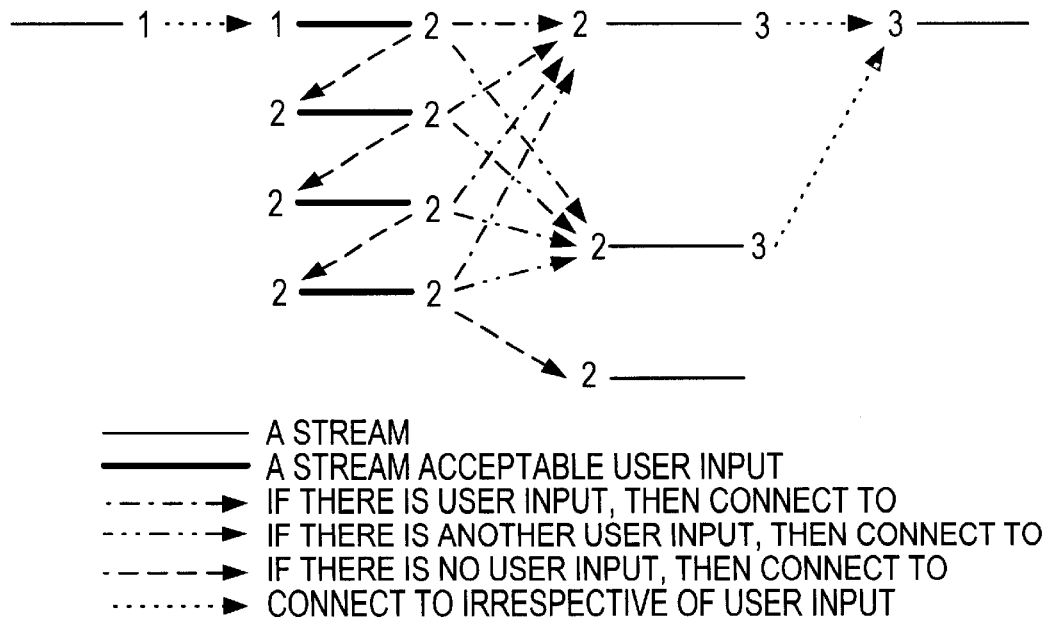

———— A STREAM
━━━━ A STREAM ACCEPTABLE USER INPUT
–·–·▶ IF THERE IS USER INPUT, THEN CONNECT TO
–··–··▶ IF THERE IS ANOTHER USER INPUT, THEN CONNECT TO
– – –▶ IF THERE IS NO USER INPUT, THEN CONNECT TO
·······▶ CONNECT TO IRRESPECTIVE OF USER INPUT

NUMERALS AT THE END OF THE SECTIONS REPRESENT STARTING AND ENDING SCENES OF THE STREAMS REPRESENTED BY THE SECTIONS. THE SAME NUMERAL MEANS THE SAME OR SUBSTANTIALLY THE SAME SCENE.

☐ A STREAM
▤ A STREAM WHICH CAN ACCEPT USER INPUT
→ IF THERE IS NO USER INPUT, THEN CONNECT TO
--▶ IF THERE IS USER INPUT, THEN CONNECT TO a ⟶ b : b,------ b ⟶ h : c,------ h ⟶------ c ⟶ h : d,------ d ⟶ h : i,------ i ⟶------

FIG. 7

| DESCRIPTION CODE IN STREAM CODE a | ADDRESS 100 (WHEN INPUT VALUE IS 0) | 150 (WHEN INPUT VALUE IS 1) | 200 (WHEN INPUT VALUE IS 1) | |
|---|---|---|---|---|
| | | ADDRESS DATA OF STREAM CODE b | ADDRESS DATA OF STREAM CODE b | WHEN STREAM a IS DISPLAYED |

| DESCRIPTION CODE IN STREAM CODE b | 100 (WHEN INPUT VALUE IS 0) | 150 (WHEN INPUT VALUE IS 1) | 200 (WHEN INPUT VALUE IS 1) |
|---|---|---|---|
| | ADDRESS DATA OF STREAM CODE c | ADDRESS DATA OF STREAM CODE h | WHEN STREAM b IS DISPLAYED |

| DESCRIPTION CODE IN STREAM CODE c | 100 (WHEN INPUT VALUE IS 0) | 150 (WHEN INPUT VALUE IS 1) | 200 (WHEN INPUT VALUE IS 1) |
|---|---|---|---|
| | ADDRESS DATA OF STREAM CODE d | ADDRESS DATA OF STREAM CODE h | WHEN STREAM c IS DISPLAYED |

| DESCRIPTION CODE IN STREAM CODE d | 100 (WHEN INPUT VALUE IS 0) | 150 (WHEN INPUT VALUE IS 1) | 200 (WHEN INPUT VALUE IS 1) |
|---|---|---|---|
| | ADDRESS DATA OF STREAM CODE i | ADDRESS DATA OF STREAM CODE h | WHEN STREAM d IS DISPLAYED |

APPARATUS FOR AND A METHOD OF CREATING AND CONVEYING AN INTERACTIVE AUDIOVISUAL WORK

BACKGROUND OF THE INVENTION

This invention relates to conveying an interactive audiovisual work to a user seamlessly Particularly, this invention relates to an apparatus for and a method of creating and conveying an interactive audiovisual work with improved reality so that a user in front of a display screen feels as if the user directly communicated with a real world in the display screen.

1. Prior Art

In order to reduce labor cost, improve working condition of an operator, or attract people's attention to new services and entertainment, interactive technology and apparatus have been developed. An interactive apparatus is designed to respond to a user in a predetermined way, such as, with predetermined image, sound, or operations. Conventional virtual reality (VR) technology creates an operator's image by computer graphics (CG) technology and stores the image in a file. In response to user input, an interactive apparatus displays the operator's image on a display screen as if an operator directly responded to a user.

Another example is an interactive audiovisual apparatus which stores plural patterns of video data of scenery and which selects and fetches the stored video data in response to user input so that a user in front of a display screen feels as if he or she were strolling in a real scenery. People can experience virtual reality by the VR technology and the above apparatus.

However, since the VR technology uses images created by CG, there is a limitation of the expression and fineness of the images due to the calculation capability of a computer and therefore the reality of the images is not so well.

On the other hand, since it is difficult for the interactive audiovisual apparatus to create and connect moving pictures seamlessly and quickly in order to respond to user input, the apparatus's response to user input is slow and lacks of reality.

2. Objects of the Invention

It is an objective of this invention to improve the reality of an interactive audiovisual work.

It is another objective of this invention to provide an apparatus for and a method of creating and conveying an interactive audiovisual work to a user in response to user input with improved reality of moving picture images.

It is another objective of this invention to provide an apparatus for and a method of creating and conveying an interactive audiovisual work to a user in response to user input by connecting streams of moving picture images seamlessly and quickly

SUMMARY OF THE INVENTION

In one embodiment of the invention, an interactive audiovisual work is divided into plural streams of motion picture image and audio data. There is provided selection means for, in response to user input, selecting a subsequent stream of moving picture image and audio data of which starting scene is substantially similar to the ending scene of a precedent stream of moving picture image and audio data.

In another embodiment of the invention, there is provided an Associated Table in which relationship between streams is stored, means for, in response to user's input, selecting, based on the Associated Table, one of the streams of which starting scene is substantially similar to the end scene of a precedent stream, and means for conveying the selected stream subsequently to the precedent stream to a user.

In another embodiment of the invention, there is provided a timing information to start the retrieval of a subsequent stream in order to quickly respond to user input.

BRIEF DESCRIPTION OF DRAWINGS

FIG. 3 is an example of the arrangement of streams of an interactive audiovisual work in accordance with a preferred embodiment of this invention.

FIG. 4 is another example of arrangement of streams of an interactive audiovisual work of a preferred embodiment of this invention.

FIG. 7 shows another example of an Associated Table of a preferred embodiment of this invention.

DETAILED DESCRIPTION OF THE PREFERRED EMBODIMENTS

Figure 1:
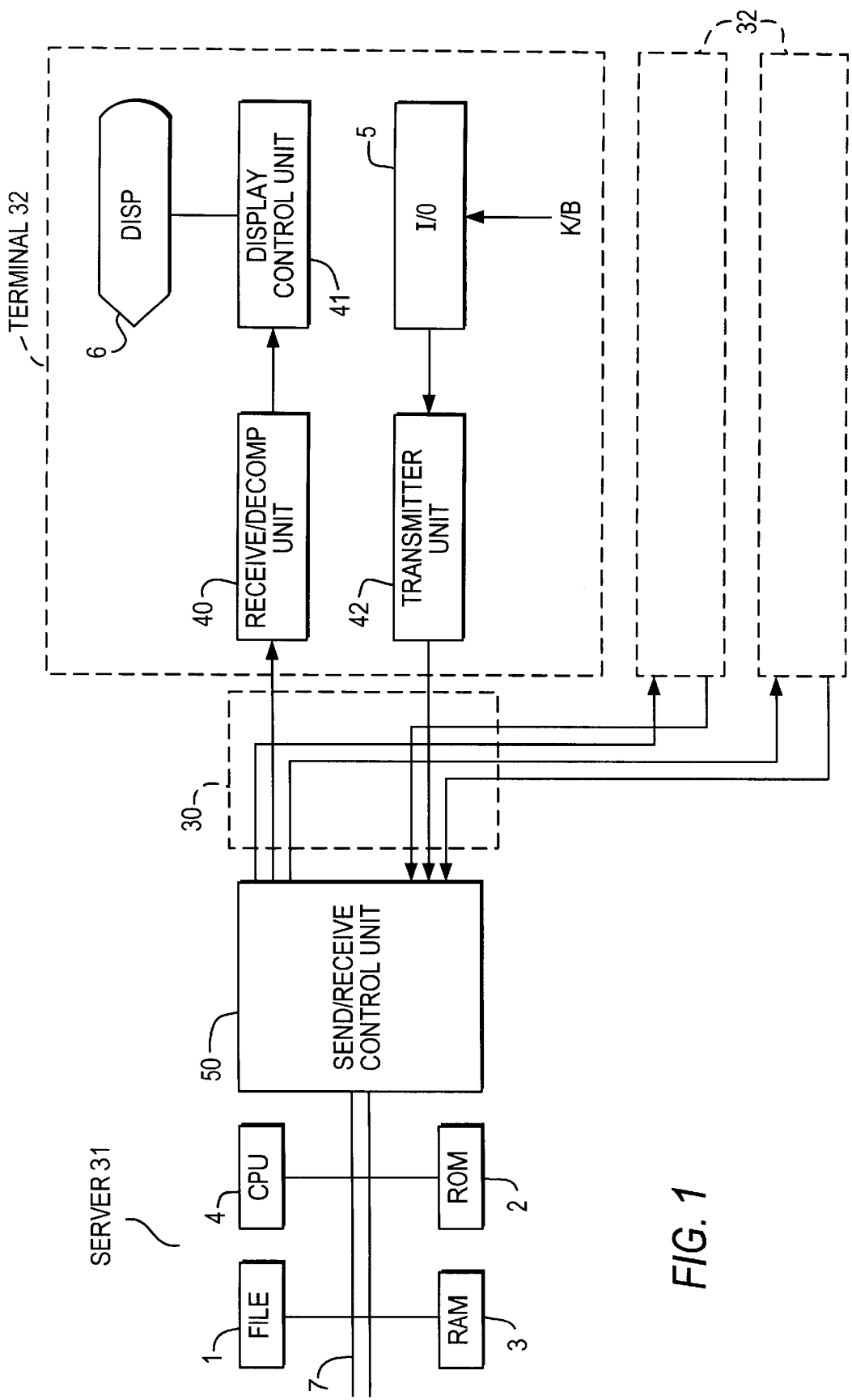
FIG. 1 is a block diagram of an apparatus for conveying an interactive audiovisual work to a user in accordance with a preferred embodiment of this invention.

FIG. 1 shows a block diagram of an apparatus for conveying an interactive audiovisual work to a user in accordance with a preferred embodiment of this invention. One of applications of this apparatus of the embodiment may be an interactive guidance system used in a lobby of a company or in a museum to replace a human receptionist or guide. An interactive audiovisual work installed in this apparatus recognizes a visitor's inquiry by voice recognition technology and responds to the inquiry by retrieving and displaying streams of appropriate video and audio data of the audiovisual work on a display screen. A receptionist or guide displayed by the streams on the display screen interactively answers to the visitor in voice and motion. The response of the receptionist or guide in voice and motion on the display screen to a visitor's inquiries is so seamless and realistic that a visitor feels as if a real receptionist or guide directly responded to the visitor on the display Another application for this apparatus may a game machine to generate moving picture image automatically or in response to user input, if necessary, in conjunction with associated information, such as, sound.

As shown in FIG. 1, the apparatus includes a server 31 which controls the retrieval of streams of moving picture image and audio data and other operations and a plurality of terminals 32 connected to the server 31 through communication lines 30 to receive the streams from the server 31 to display images on a display 6 and send user input to the server 31.

The communication line 30 may be public telephone line to connect a terminal 32 to the host 31 by dial-up connection, or LAN to physically connect a terminal 32 to the host 31 for sending and receiving streams on demand. A user may enter instructions or input into a terminal 32 in response to picture image from the host 31 and displayed on the display 6 or directly into a terminal 32. This user's instruction or input is sent from the terminal 32 to the server 31 through the communication line 30.

The server 31 has a File 1, a ROM 2, a RAM 3, a CPU 4, a bus 7 and a send/receive control unit 50. The File 1 may be a hard disk drive, CD-ROM, or magneto-optical disk for storing streams and an Associated Table in which relationship between the streams is stored. CPU 4 controls reading out of streams from the File 1 with control programs stored in the File 1 and ROM 2. The send/receive control unit 50 sends streams read out from the File 1 to terminals 32 and receives user input from terminals 32 through the line 30. The bus 7 connects the File 1, ROM 2, RAM 3, CPU 4 and the send/receive control unit 50 each other.

In response to user input from a terminal 32 through the communication line 30 and the send/receive control unit 50, CPU 4 selects a stream to be displayed next by referring to the Associated Table stored in the File 1 or stored in RAM 3 as the case may be. The CPU 4 reads out streams from the File 1 based upon the selection from the Associated Table and conveys the streams to a corresponding terminal 32 through the send/receive control unit 50.

Each terminal 32 is provided with an input/output control unit (I/O) 5 to control and receive user input from a keyboard (K/B), mouse, or the like, a picture display unit (DISP) 6 to display motion picture image, a receive and decompression unit 40 to receive and decompress streams from the server 31, a display control unit 41 to control the display unit 6, and a transmitter unit 42 to transmit user input from the I/O control unit 5 to the server 31.

Other input devices, such as, microphone and voice recognition software, may be used as user interface for inputting user input into the terminal 32. All kinds of display devices, such as, CRT Display and LCD, may be used for the display unit 6. The communication line 30 may be eliminated by incorporating a terminal 32 into the server 31 unit. There are a plurality of terminals 32 in FIG. 1. But, there may be only one terminal 32.

Figure 2:
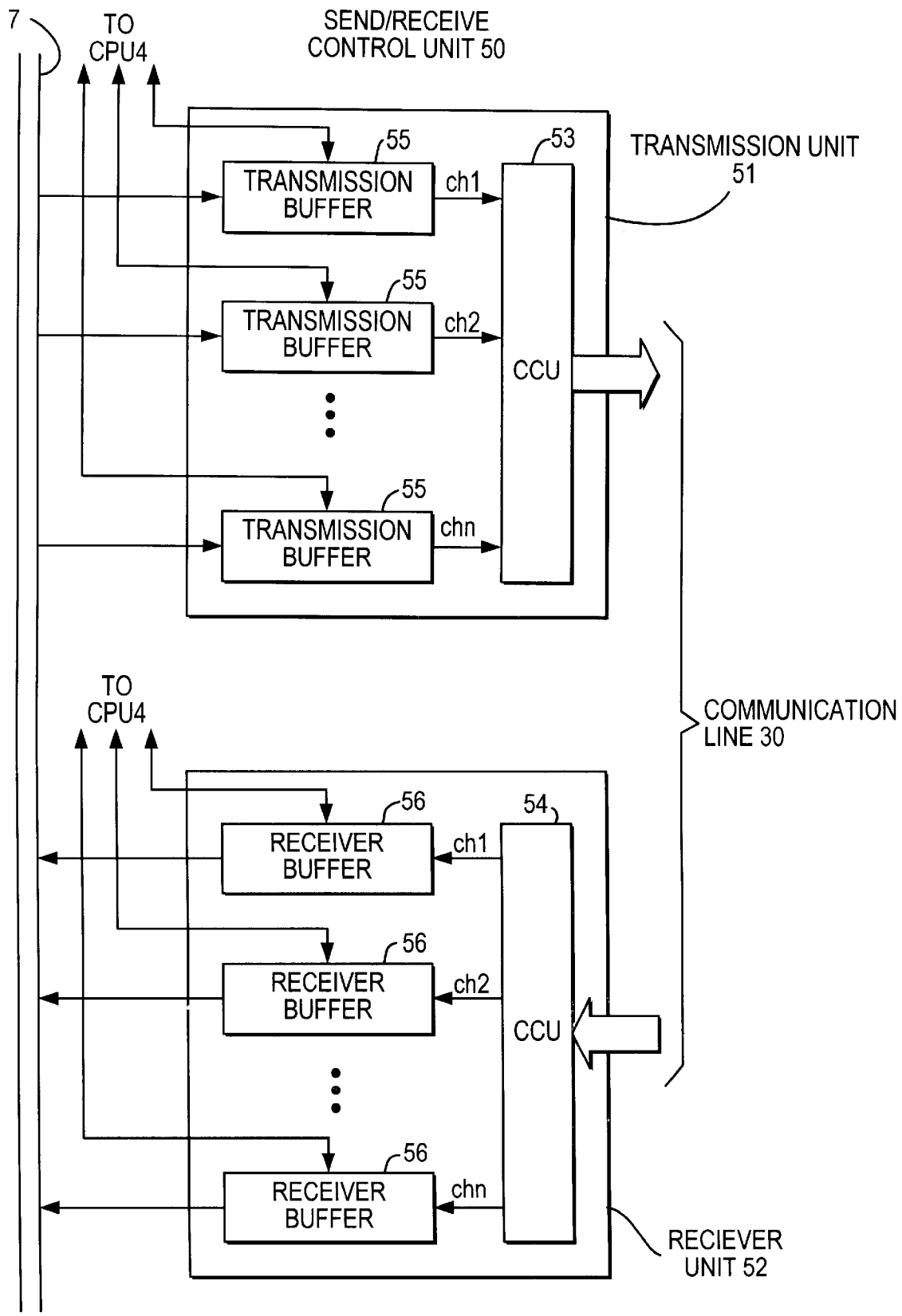
FIG. 2 is a block diagram of a control unit of transmitter and receiver of a server included in a preferred embodiment of this invention.

As shown in FIG. 2, the send/receive control unit 50 includes a transmission unit 51 and a receiver unit 52. Both transmission and receive units have a plurality of channels, ch1, ch2, . . . , chn, corresponding to each of terminals 32, respectively. The transmission unit 51 has transmission buffers 55 for temporarily storing data to be sent through each channel. Communication control unit (CCU) 53 sends data from the transmission buffers 55 to the communication lines 30. The receiver unit 52 has communication control unit (CCU) 54 for distributing data received from the communication line 30 to each channel. Receiver buffers 56 temporarily store the data received from each channel. The CPU 4 in FIG. 1 is monitoring the content remaining in the transmission buffers 55 so as to control the transmission of streams to each channel.

A. Video Data

Video data, which is composed of a number of streams, may be motion picture that is actually taken with a video camera or generated with CG technology. The motion pictures may include a person or other object that acts or moves in response to user input. The video data is compressed by MPEG, H.261, or other video compression technology to store in the File 1. The video data may be multiplexed with audio data in order to handle both video and audio data at the same time. The video data is created beforehand by each stream of a predetermined length. The video data may be stored in RAM 3 while in operation. The shortest limitation of a predetermined length of streams which can accept and respond to user input to select and convey a subsequent stream is determined by hardware, software and network environmental factors as explained below. The longest and the shortest limitations of a predetermined length of other streams are also determined by those environment factors.

As explained below, streams to be conveyed in series to a user in response to user input are created in a manner that the ending scene of a precedent stream matches the starting scene of a subsequent stream. Thus, the connection portions of streams to be connected in series are created and edited so that when the streams are conveyed and displayed in series to a user, an interactive audiovisual work seems to be seamless.

By reducing time taken to retrieve a next stream in response to user input, the apparatus can seamlessly convey and display streams so that a user in front of a display screen feels an interactive audiovisual work responding to the user naturally.

B. Arrangement of Streams

In order to seamlessly display an interactive audiovisual work on a display screen in accordance with user input within a certain time period, there is provided a basic arrangement for streams which includes one stream connectable to a number of subsequent streams in response to user input and another stream connectable to a number of precedent streams.

In order to immediately respond to user input, streams, which can accept user input while being displayed, should be as short as possible. For example, while displaying consecutive streams of a few second duration, the apparatus can respond to user input within a few seconds to switch to displaying a stream appropriate to user input at any time.

In order to preventing the number of streams from increasing too large, which tends to happen when a number of streams connecting to a number of other streams are arranged in series, there is provided a stream which can be connected from a number of precedent streams.

FIG. 3 and FIG. 4 show representative examples of arrangement of streams connectable to each other in response to user input while being displayed. In FIGS. 3 and 4, sections of line represent streams of video and audio data which are parts of an interactive audiovisual work of this embodiment. Numerals shown at the ends of the sections of line represent scenes at ends of streams. The scenes represented by the same numeral are the same scenes. Both streams are connectable at an end having the same scene. Sections of bold line show streams which can accept user input while being displayed to select an appropriate subsequent stream in response to user input. Several kinds of arrows represent connection flows of streams depending on predetermined conditions. Those conditions are, an input from a user (an arrow with chained line), another input from a user (an arrow with two dot chained line), no input from a user (an arrow with broken line) and irrespective of any input from a user (an arrow with dotted line), respectively. FIG. 3 shows an arrangement of streams in which each stream has different combination of starting and ending scenes. FIG. 4 shows another arrangement of streams in which there are a first group of streams having the same starting and ending scene and a second group of streams having the same starting scene as the first group but having a different ending scene. In the arrangement of FIG. 4, there are more choices for a subsequent stream in response to user input. Each stream in FIGS. 3 and 4 may have different contents or story of the interactive audiovisual work therein irrespective of its starting and ending scenes. An interactive audiovisual work of this embodiment may be composed of the combination of two kinds of the arrangements of streams shown in FIGS. 3 and 4. However, as long as the scenes of streams at connection are the same or substantially the same, those streams are connectable in response to user input. In addition, the contents of each stream and the arrangement of streams have no limitation. An interactive audiovisual work in accordance with the preferred embodiment can show varieties and flexibility in its story in response to user input.

C. Associated Table

There is provided an Associated Table for each channel in order to select streams to be conveyed to each terminal 32 by a table driven control method. The File 1 stores Associated Tables storing relationship between streams of an interactive audiovisual work and predetermined conditions, such as, user input, history of user's prior use, connection time of a user through communication line 30, and so on in order to select appropriate streams in response to user input. Associated Tables may be stored in RAM 3 in operation for a high-speed operation. CPU 4 refers to Associated Table during the display of an interactive audiovisual work in order to select a stream to be displayed next in accordance with the predetermined conditions, such as, user input, information about a stream being displayed to a user now, and so on.

Figures 5, 6:
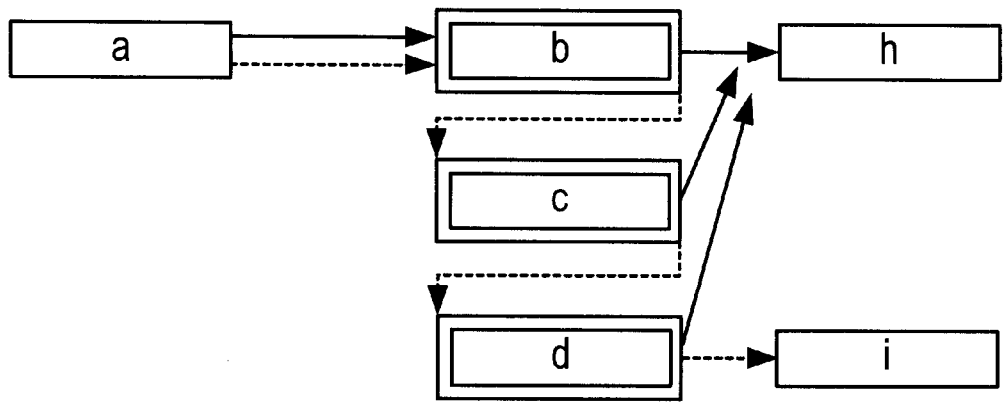
FIG. 5 shows a sequence of conveying streams of an interactive audiovisual work in the apparatus in FIG. 1.
FIG. 6 shows an example of an Associated Table of a preferred embodiment of this invention.

FIG. 5 shows an example of predetermined conditions to select streams of the interactive audiovisual work to be displayed next. The File 1 stores streams a, b, c, d, h, and i. The streams b, c, and d can accept user input while being displayed. As shown in FIG. 5, the stream a connects to the stream b irrespective of input from a user. Then, the stream b connects to the stream h if there is user input while being displayed, otherwise to the stream c. Then, the stream c connects to the stream h if there is user input while being displayed, otherwise, to the stream d. Then, the stream d connects to the stream h if there is user input while being displayed, otherwise to the stream i. In FIG. 5, an arrow with solid line shows a connection flow of a stream when there is user input and an arrow with broken line shows a connection flow of a stream when there is no user input.

FIG. 6 shows a summary of an Associated Table storing relationship between the streams and predetermined conditions to select a stream to be displayed next according to the example in FIG. 5. In the Table of FIG. 6, the representation [a ->b:b . . . ] means that the stream b is selected to be displayed after the stream a irrespective of user input. The representation [b ->h:c . . . ] means that the stream h is selected to be displayed after the stream b if there is user input while the stream b being displayed or until a certain time limit during the display of the stream b, otherwise the stream c is selected to be displayed after the stream b.

The Association Table is actually composed of a description table for each stream code as shown in FIG. 7. If there is no user input, an input value is 0 and if there is a user input, an input value is 1 in the description table. The description table for each stream code in FIG. 7 includes address data of subsequent stream codes to be selected and displayed next depending upon user input. As shown in FIG. 7, address data for a stream code to be displayed next is indicated by the input value 0 or 1 depending on whether or not there is user input. The input value may be determined by not only user input but also other factors, such as, prior use of the stream by a user.

In order to use history of a particular user's use, a user code is provided for each user. Each time a user selects a particular stream, information about the selection of a stream is recorded. When selecting a next stream, CPU 4 uses the information from the user code and generates a value with which the input value is replaced to select a next stream from a description table.

There is another alternative to select a next stream code from a description table. A value to select address data of a next stream code from a description table may be changed by user code information so as to fit a particular user's taste. There is another alternative to select a next stream from a description table by modifying input information with a conversion table to generate a modified input value to locate address data of a next stream in a description table.

FIG. 7 shows an example of description table in Associated Table simplified in many ways for explanation purpose. A description table for each stream in FIG. 7 shows the status in RAM 3 showing address data included in a stream code for selecting a next stream. The address of a description table in FIG. 7 is just an example for explanation purpose.

CPU 4 refers to a description table in Associated Table of a stream code information in RAM 3 to select a next stream by using an input value indicating address data of a next stream in the description table. Then, CPU 4 fetches a next stream code information from the stored location in the File 1 and stores the next stream code information to RAM 3. CPU 4 may use other information instead of an input value or a combination of other information with an input value to select address data in description table. Then, CPU sends a next stream code information to a transmission buffer 55 in FIG. 2. Hereinafter, the CPU 4 repeats the above operation.

Figure 8:
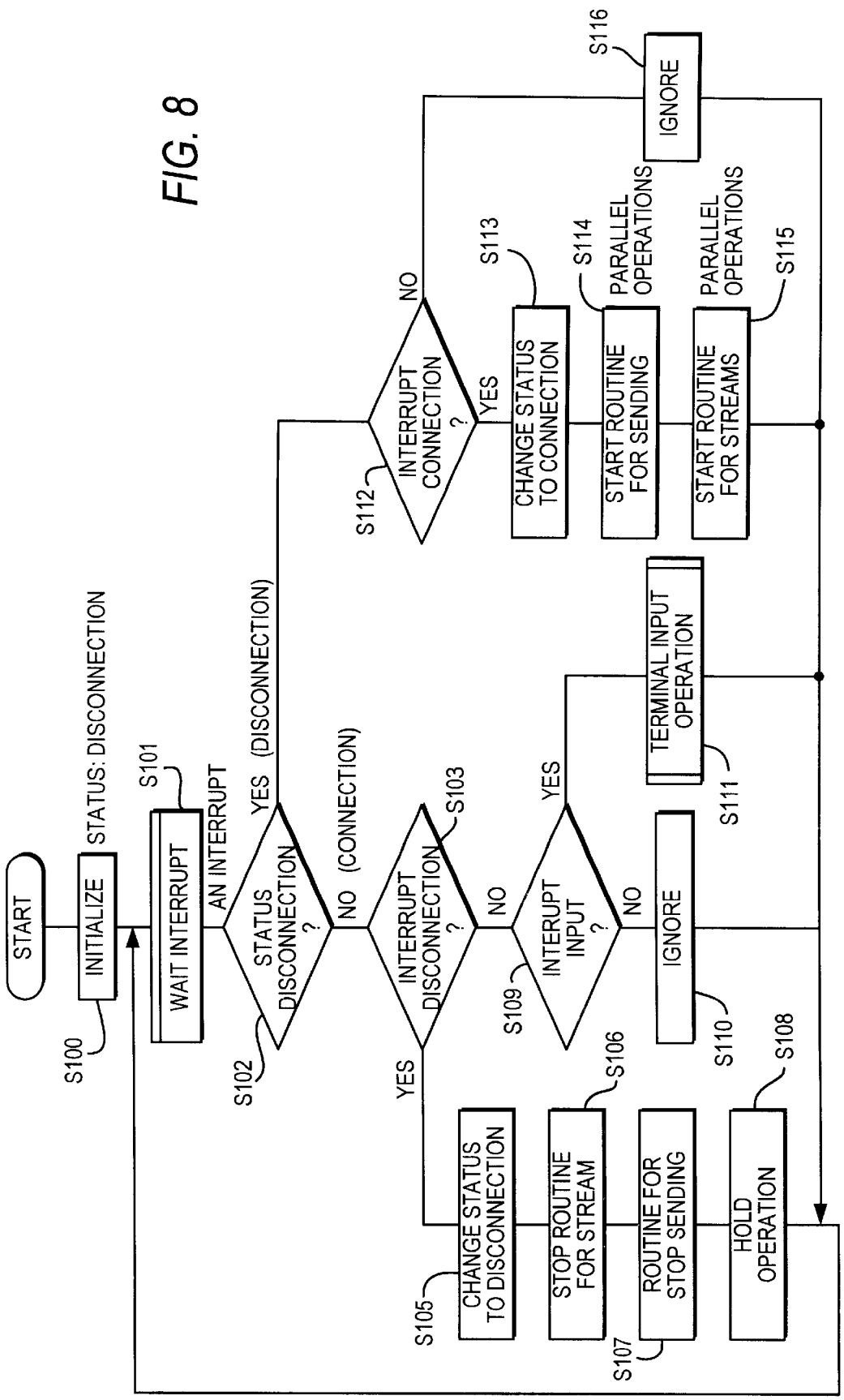
FIG. 8 is a flow chart to show process to handle a terminal job at each channel of a preferred embodiment of this invention.

An interrupt request, such as, disconnection of communication line, from communication line 30 is handled as shown in FIG. 8. FIG. 8 shows a flow chart of process to handle interrupt requests based on the type of interrupt requests and status of each port connecting to terminals 32.

In general, there are two types of operations to handle input and output from and to terminals 32. The polling operation checks periodically all terminals 32 whether or not there is input from a particular terminal and, if there is input, the input is handled. The event driven operation handles a job in response to a hardware interrupt resulting from an event. The server of this embodiment handles input and output by the event driven operation. In addition, the server of this embodiment holds the state of each port to handle operations based on its transitional state.

In this embodiment, after the server grants a hardware interrupt request to a port (physical or logical) to which a terminal 32 is connected, the server handles input and output jobs for the terminal 32 based on the type of interrupt request. In addition, the server keeps information about the connection or disconnection of terminal 32 to each port in order to convey a stream to a terminal 32.

Figure 9:
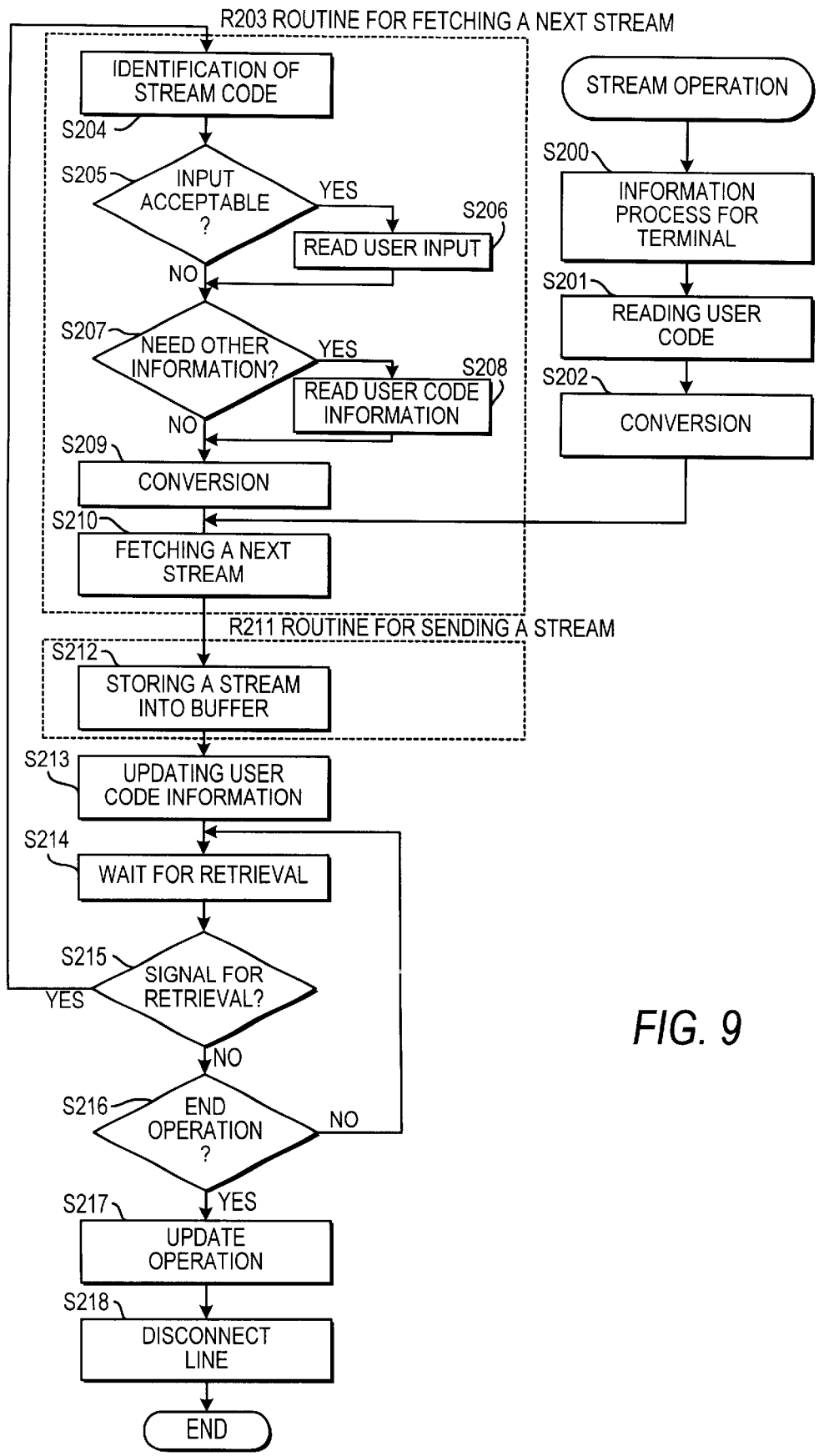
FIG. 9 is a flow chart to show process to convey streams seamlessly in response to user input in accordance with a preferred embodiment of this invention.

Hereinafter, the operation of the apparatus of the embodiment using a table driven method is explained. CPU 4 of the server 31 is monitoring an interrupt request from each channel indicating the connection of a terminal 32. After the connection, CPU 4 handles operations as shown in FIG. 9.

1. Fetching Stream Code

When a signal for starting the retrieval of a next stream is issued while a stream being displayed (S215), a routine (R203) for fetching a next stream starts. The signal for starting the retrieval of a next stream (S215) is explained below. The routine (R203) for fetching a next stream has the following steps: referring to information of the stream code already stored in RAM to identify a table conversion method and other unique values (S204), then, checking if input is acceptable to the stream (S205), if so, reading out user input from the receiver buffer 56 to generate input value (S206), If other information is necessary to select a next stream, reading out user code information and/or other information from RAM 3 to generate input value (S208) with them, calculating address data of a next stream by Associated Table (S209) using user input, user code and other information, and fetching a next stream code from the File 1 in accordance with the address data calculated by the Table and storing the next stream code in RAM3 (S210).

If the terminal 32 first connects to the server 31, the address data of the first stream to be sent is calculated by using information about the terminal connection (S200), user code information to know prior use of the user (S201), and a conversion table (S202). New use code is allocated to a user if a user uses the apparatus at first time.

All streams may be transferred from File 1 to RAM3 beforehand. Alternatively, it can save both memory space of RAM 3 and time taken to transfer a next stream to a transmission buffer 55 if all streams which can be selected as a next stream are fetched from the File 1 and stored in RAM 3 before the retrieval operation starts and, after the retrieval operation starts, a stream selected as a next stream is transferred from RAM 3 to the buffer 55.

The Associated Table is created beforehand and stores relationship between streams so that the apparatus convey streams to a terminal to display an interactive audiovisual work in accordance with its story and in response to user input or other information.

D. Creating an Interactive Audiovisual Work

Figure 10:
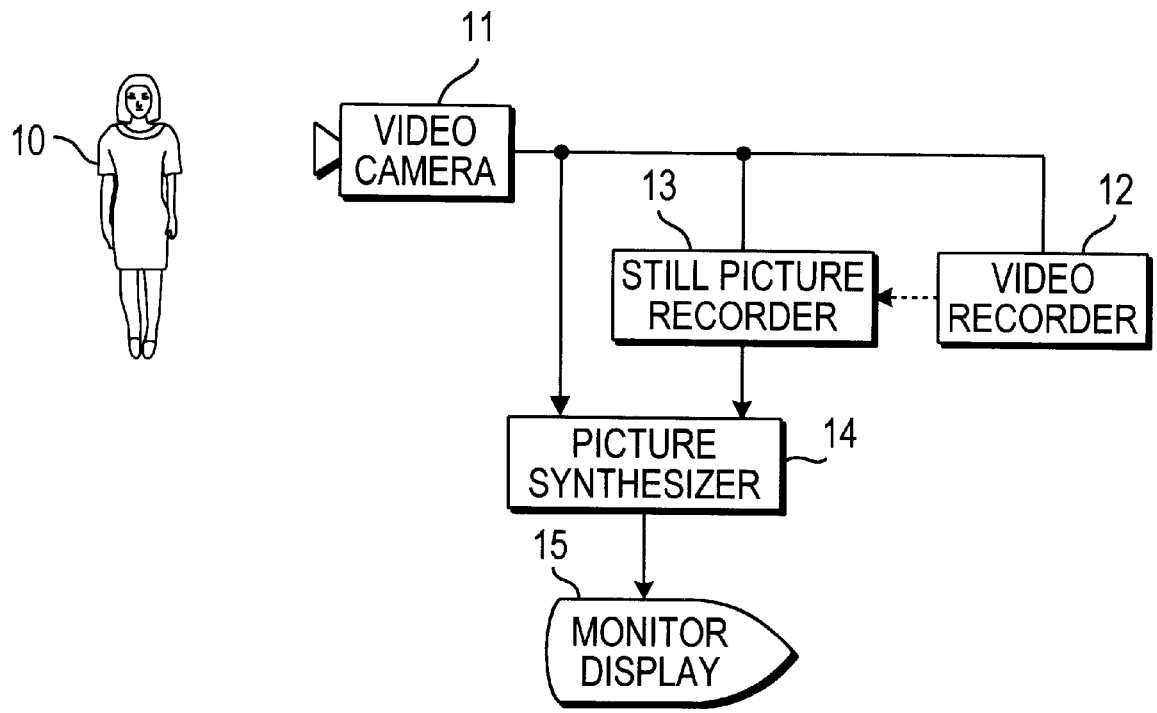
FIG. 10 is a block diagram of an apparatus for creating an interactive audiovisual work in accordance with a preferred embodiment of this invention.

Streams of an interactive audiovisual work to be displayed in series are created so those scenes of connecting portions of the streams seem to be seamless when the streams are connected in series. That is, the ending scene of a precedent stream and the starting scene of a subsequent stream are created so as to match each other. FIG. 10 shows a video camera system according to a preferred embodiment of this invention to create an interactive audiovisual work. As shown in FIG. 10, the video camera system has a video camera 11 to take moving pictures of an object 10, for example, an actress, a video recorder 12 to record video signal and other information from the video camera 11, a still picture recorder 13 to record a still picture from video signal from the camera 11 in response to input from a user, a picture synthesizer 14 to synthesize video signal from the video camera 11 and a still picture from the still picture recorder 13 and reverse the synthesized picture horizontally, and a monitor display 15 to display the synthesized image on its display screen. The display screen on the monitor display 15 may be positioned to face the object 10.

Video data of an interactive audiovisual work is created by the video camera system in FIG. 10. Video data of each stream of an interactive audiovisual work may be created one by one in accordance with Associated Table. Or, video data of an interactive audiovisual work may be divided into a number of streams after all work is created by the video camera system.

Matching of scenes of streams can be made each time when video data of each stream is created by the video camera system. Or, matching of scenes of streams can be made while editing video data after taking all pictures of the streams.

As for an interactive animation work of which scene is drawing or image created by CG, the same scene is used for the ending scene of a preceding stream and the starting scene of a subsequent stream.

1. Matching Scenes of Streams at Connection

If ending and starting scenes of streams are matched each time when streams are created by the video camera system in FIG. 10, still pictures of connecting parts of streams are recorded beforehand. That is, the ending scene of a stream is recorded as a still picture by the still picture recorder 13 if there is any stream subsequently following that stream. The starting scene of a stream is recorded as a still. picture by the picture recorder 13 if there is any stream directly preceding that stream.

Figure 11:
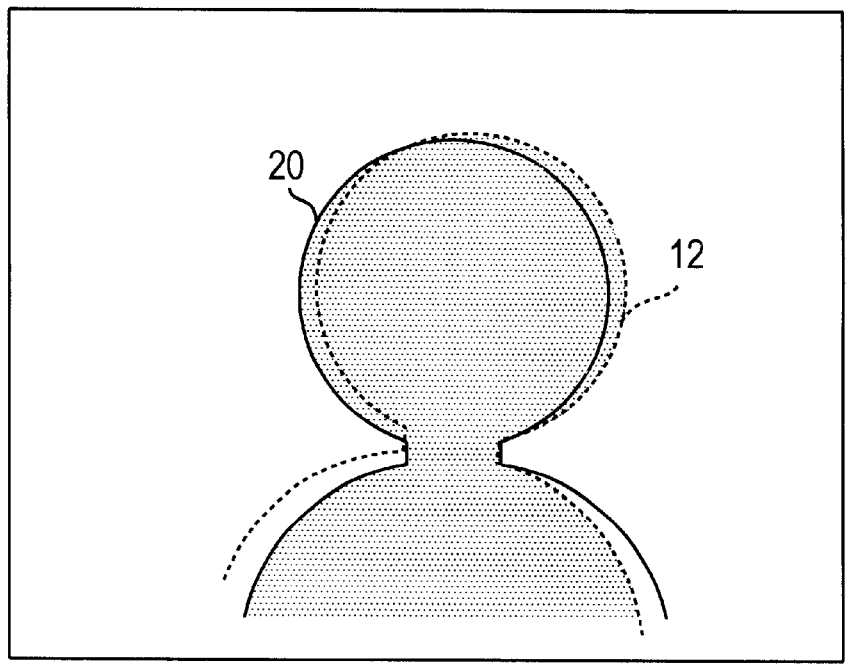
FIG. 11 is a schematic view of a display screen of the apparatus in FIG. 10.

The picture synthesizer 14 synthesizes a still picture of connecting part of a stream provided from the still picture recorder 13 with video images provided from the video camera 11. The synthesizer 14 synthesizes two images by adding two synchronized video. signals from the recorder 13 and the camera 11 equally and then reverses the right-hand side and left-hand side of the synthesized image. Adding ratio of two images may be changed to easily recognize two images. FIG. 11 shows a synthesized image displayed on the display monitor 15 although it is simplified for explanation purpose. Video image 20 from the video camera 11 is superimposed on a still picture 21 from the still picture recorder 13. The synthesizer 14 may alternatively send a still picture image from the recorder 13 and video image from the video camera 11 with some time period without superimpose but with reversing the right-hand and left-hand sides to the display monitor 15. The synthesizer 14 may create outline of a still picture image from the recorder 13 and superimpose the outline of the still picture on the video image from the video camera 11 with reversing right-hand and left-hand sides. The synthesizer 14 may create outline of a still picture image from the recorder 13 and outline of the video image from the video camera 11 and superimpose both of the outlines with reversing right-hand and left-hand sides. The synthesizer 14 may create difference between a still picture image from the recorder 13 and video image from the video camera 11 and display the difference with reversing right-hand and left-hand sides on the display monitor 15. The synthesizer 14 may superimpose the difference on video image from the video camera 11 with reversing right-hand and left-hand sides. The synthesizer 14 may change color of one of a still picture image and video image and superimpose both images with reversing right-hand and left-hand sides. The synthesizer 14 may choose odd number of scanning lines from a still picture image from the recorder 13 and even number of scanning lines from video image from the video camera 11 and display both of odd and even number scanning lines with reversing right-hand and left-hand sides on the display monitor 15.

It is easy to match starting and ending scenes of steams by the video camera system in FIG. 10 because the video camera 11 and/or the object 10 can be adjusted by viewing a synthesized image on a display screen of the monitor 15 as shown in FIG. 11 so that both of a still image and video images register. Since the synthesized image on the monitor 15 reverses its right-hand and left-hand sides, the object 10 in the synthesized image on the monitor 15 moves in the same direction as the direction in which the object 10 moves in front of the video camera 11. If the synthesizer 14 may send a still picture image from the recorder 13 and video image from the video camera 11 alternatively for some time period without superimpose but with reversing right-hand and left-hand sides to the monitor display 15, it is easy to compare a still picture image with stream following or preceding the still picture. If the video camera 11 or the object 10 moves around the connection of streams and, particularly, immediately after the connection, the video camera 11 or the object 10 continues to move, a small difference between scenes of the streams at the connection which can not be eliminated by matching is absorbed by the motion of the video camera 11 or the object 10. In order to absorb the difference effectively, the direction, speed and distance of the movement of the camera 11, the object 10, or a part of the object is determined before a subsequent stream is taken by the camera 11. Small difference is also negligible if a subsequent stream has an outstanding event on a display screen immediately after the connection to attract user's attention to the event.

2. Editing Video Data at Connection

Even matching scenes at the connection of streams while creating, it may be necessary to display streams at a predetermined flame rate on a display screen in order to check if the connection of streams seem to a user to be seamless. If the connection of streams does not seem to be seamless, editing streams may be necessary to make streams more seamless.

The editing of streams is, for example, to choose one of frames from the ending part of a precedent stream and choose another frame from the starting part of a subsequent stream so that the streams seem to be most seamless when the streams are connected at the chosen frames. The former chosen frame becomes the last frame for the precedent stream and the latter frame becomes the first frame for the subsequent stream. The editing may be done between all streams to be connected in an interact audiovisual work. When connecting still pictures or scenes, chosen frames need to be more identical. But, when connecting moving pictures or scenes, there may be small difference between chosen frames as far as the difference is in line with the movement of the images or objects in the scenes. Scenes in a stream seem to be slower if more frames are added to the scenes. Scenes in a stream seem to be quicker if frames are taken out from the scenes. This technique may be used for editing streams. Increasing or decreasing the speed of scenes at the connection of two streams can make the connection seamless. The difference between the ending scene of a precedent stream and the starting scene of a subsequent stream is absorbed by adding intermediate frames having intermediate difference between the scenes to the ending scene of the precedent stream or the starting scene of the subsequent stream. The images or scenes at the connection of the streams can be more smooth and seamless by this technique.

The editing explained above may be done for all streams to be connected in an interactive audiovisual work. The edited streams are compressed at a predetermined frame rate and stored in the File. The above explained technique can make scenes at the connection of two streams substantially seamless and smooth up to 30 frames per second at which streams are displayed to a user.

3. Space Filtering

Space filtering, such as, reducing contrast between pixels of scenes, can make two streams connected seamlessly. It may be more effective to insert scenes treated by the same space filtering into a stream at random. Space filtering may be done with scenes before compression and then compression may be done with entire stream. Or, at compression, an operation to reduce the contrast of pixels in scenes may be done.

E. Timing for Retrieving a Next Stream

It is desirable for an interactive audiovisual work to provide a user a longer period while user input is acceptable. In order to extend the period while user input is acceptable, however, it is necessary to delay the timing to start the retrieval of a next stream as late as possible. Late timing for starting the retrieval of a next stream tends to cause an intermission of conveying a stream because a next stream is not conveyed in time to a terminal. Cutoff of images or a still scene may occur resulting from the intermission. Since the length of each stream is different, the best timing for starting the retrieval of a next stream varies for each stream. It is necessary to determine the best timing for starting the retrieval of a next stream for each stream.

There are the following methods to determine the retrieval timing.

1. The First Method

There is provided a code in streams to start for the retrieval of a next stream. When sending a stream to the communication line 30 through the transmission buffer 55 of the transmit unit 51 in FIG. 2, CPU 4 reads the code and turns software switch on for starting the retrieval. In this case, a frame starting the retrieval of a next stream includes the code for starting the retrieval in a user layer of the header of coded information.

2. The Second Method

Figure 12:
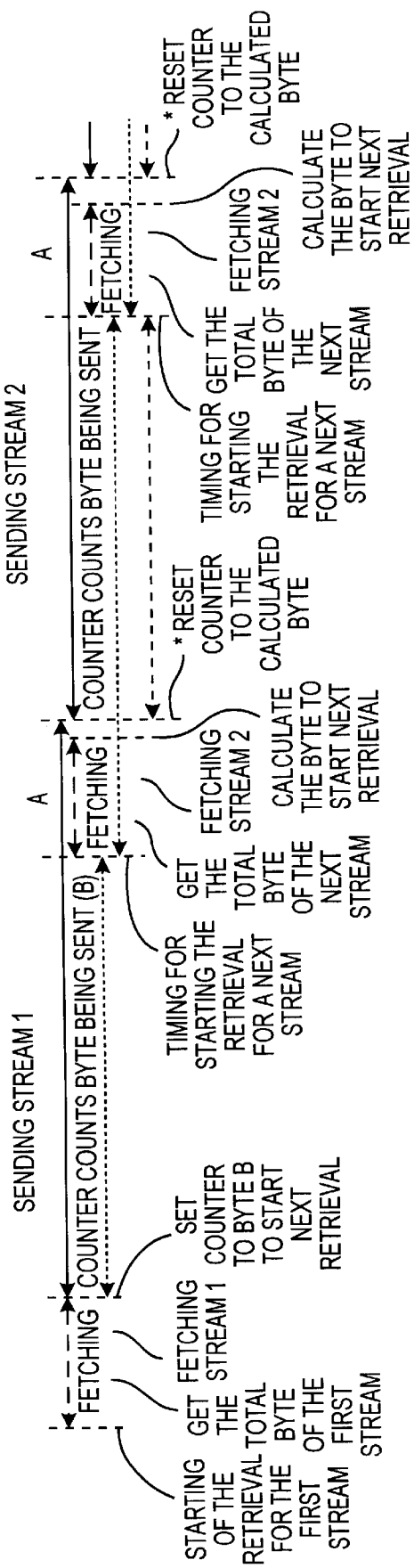
FIG. 12 is a schematic chart of streams being sequentially conveyed to show timing information for starting the retrieval of a subsequent stream in accordance with a preferred embodiment of this invention.

The timing for starting the retrieval is determined by a data counter which counts sent data when stream data is sent to the communication line 30 from the transmission buffer 55. When the counter counting data sent to the communication line 30 reaches at a predetermined value, CPU 4 turns software switch on for starting the retrieval. As shown in FIG. 12, the timing for starting the retrieval for each stream is determined as the time when a predetermined byte A of a stream remains in the buffer 55 before completing the transmission of the stream. CPU 4 detects the total byte of a stream when fetching the stream from File 1. Then, CPU 4 subtracts the predetermined byte A from the total byte of the stream to get byte B for the stream. The byte B is the data to be sent to the line 30 to reach at the timing for retrieval for a next stream. CPU 4 watches the content of the counter when the counter is counting the data of a stream sent from the starting of the stream. When the counter reaches to the byte B, CPU 4 starts the retrieval for a next stream and resets the counter to zero. Then, the counter starts to count data sent to the line 30 from the buffer 55 until CPU 4 detects that the content of the counter reaches to the total byte of the next stream. At that time, the remaining byte of the next stream in the buffer 55 is byte A as shown in stream 2 in FIG. 12 and the retrieval for a next stream starts again.

Alternatively Each time when sending a stream from the buffer 55 to the line 30 starts, CPU 4 sets the content of the counter to byte B calculated by the above method. Each time when the counter becomes zero, the retrieval for a next stream starts.

3. The Third Method

Figure 13:
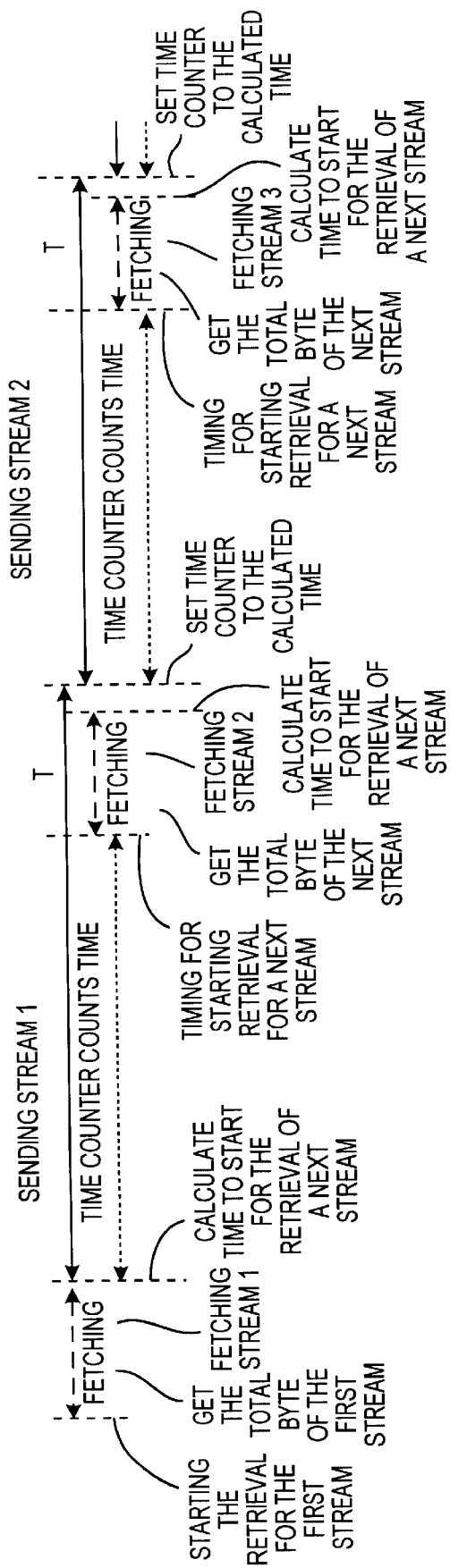
FIG. 13 is another schematic chart of streams sequentially conveyed to show timing information for starting the retrieval of a subsequent stream in accordance with a preferred embodiment of this invention.

An interrupt to start the retrieval for a next stream is issued when a predetermined period elapses after sending of a stream. A predetermine time T before completing the sending of a stream is chosen to start the retrieval for a next stream as shown in FIG. 13. CPU 4 calculates the total time taken for each stream to sent to the line 30 based on the size of a stream. By subtracting the predetermined time T from the calculated total time, CPU 4 gets the timing for issuing an interrupt to starting the retrieval for a next stream. Each time when sending a stream from the buffer 55 to the line 30 starts, CPU 4 resets a time counter to zero and the time counter starts to count the elapsed time. CPU 4 checks the time counter if the elapsed time reaches to the calculated timing. When reaching to the calculated timing, CPU 4 starts the retrieval for a next stream. The same process is repeated again for each transmission buffer 55. In order to use the above methods, the sending to and displaying a stream on a terminal needs to be synchronized with each other and streams need to be compressed by a constant bit rate method.

4. The Fourth Method

Figure 14:
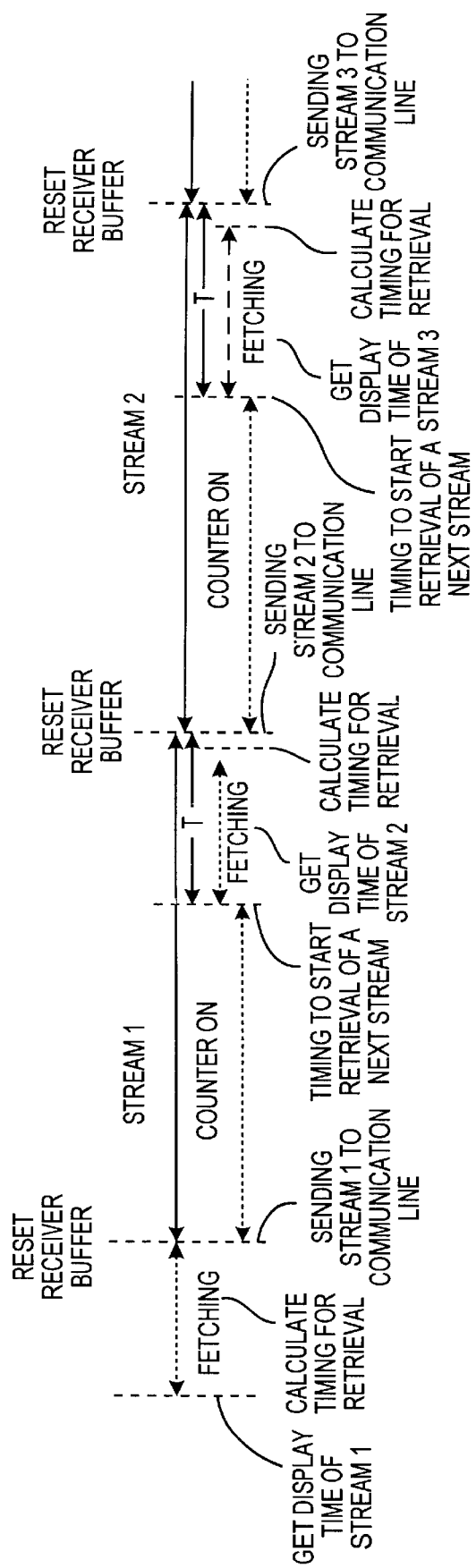
FIG. 14 is another schematic chart of streams sequentially conveyed to show timing information for starting the retrieval of a subsequent stream in accordance with a preferred embodiment of this invention.

FIG. 14 shows the fourth method which can be used in the apparatus that the sending and the displaying of a stream are not synchronized with each other and streams are compressed by a variable bit rate method. In this method, each stream has display time data telling its display time. The display time data is stored with the address data of a stream in a particular field of a steam code. When fetching a stream code from File 1 to store the stream code in RAM 3, CPU 4 reads the display time of the stream and subtracts a predetermined time T from the display time to get a timing for starting the retrieval for a next stream. When sending a stream to the communication line 30, a time counter counts time until reaching to the timing. Reaching at the timing, CPU 4 starts the retrieval for a next stream and resets the time counter to zero. The time counter counts time again until it reaches to the display time of the next stream. Then, CPU starts the retrieval for a next stream. The same operation is repeated again.

The apparatus of the preferred embodiment of this invention using one of above methods to start the retrieval for a next stream can convey streams to a user without any intermission of an interactive audiovisual work. According to the apparatus of the embodiment, a number of fragmentary streams of an audiovisual work can be connected with each other in response to user input seamlessly and smoothly so that a user in front of a display displaying the interactive audiovisual work feels as if the user directly communicated with a real world in the display If sending and displaying a stream are synchronized with each other, CPU 4 can have the server receive user input from a terminal 32 just after starting of the sending of a stream which can accept user input. At the time when starting the retrieval for a next stream, CPU 4 disables the server to receive any user input from a terminal 32 until completing the sending of the stream currently displayed at the terminal. This is necessary to match a stream and user input corresponding to the stream. CPU 4 may ignore the content in the receiver buffer 56 after starting the retrieval for a next stream and reset the content of the buffer 56 when starting of the sending of a next stream from the buffer 55. CPU 4 reads the first user input store in the buffer 56 from the sending of a stream from the buffer 55 to the timing for the retrieval of a next stream determined by the above method. CPU 4 may start the retrieval and disable the receiver buffer 56 as soon as CPU 4 reads the first user input in the receiver buffer 56.

If the display of a stream is extended and delayed after completing of the sending the stream from the buffer 55 due to decompression at a terminal 32, user input in the extended display time is neglected by CPU 4.

CPU 4 may reset the content of the receiver buffer 56 each time when timer counts the display time of each stream in order to match a stream and user input corresponding to the stream irrespective of synchronization of sending to and displaying of a stream on a terminal. If the display of a stream at a terminal 32 is extended and delayed due to decompression or other reasons, the extended time should be added to the display time. It is preferable for a stream accepting user input to have relatively brief display time in order to quickly respond to user input. The shorter display time a stream has, the quicker the stream changes to a next stream in response to user input.

However, it takes time for the apparatus to retrieve a stream in response to user input, and send to and display the stream at a terminal depending on hardware, software, and network environmental factors. The display time of a stream need to be long enough to cover the time taken by the factors after starting the retrieval of a next stream. The time to cover the hardware, software, network, and other environmental factors is one or two seconds at most for an ordinary case. For most of interactive audiovisual works, users usually do not feel that the time affects the response of the work.

Although the embodiment of the invention has been described about seamless connection of video data of two streams, the same technique can be used to seamless connection of audio data of two streams.

According to the invention, an apparatus for and a method of conveying an interactive audiovisual work to a user can respond to user input quickly by using Associated Table which stores relationship between streams to be sent and displayed to the user in response to user input.

According to the invention, an apparatus for and a method of conveying an interactive audiovisual work can display the work seamlessly and naturally by connecting a precedent stream to a subsequent stream, each having the same scene at connection, in response to user input.

According to the invention, an apparatus for and a method of conveying an interactive audiovisual work to a user can convey motion picture to a user without intermission by starting the retrieval of a next stream having a matching condition within a predetermine timing in order to connect plural fragmental streams of video and audio data in response to user input.

According to the invention, an apparatus for and a method of creating an interactive audiovisual work can create an audiovisual work which can connects plural fragmental streams of video and audio data seamlessly in response to user input by easily matching scenes at connection part of streams.

What is claimed is:

1. An apparatus for transmitting streams of video data from a server computer to a user terminal for displaying the streams of video data on said user terminal, comprising:

means for storing a plurality of streams of video data in said server computer, said plurality of streams being able to be transmitted one by one from said server computer to said user terminal, each of said plurality of streams including a starting scene and an ending scene to be displayed at the beginning of and the ending of each of said streams, respectively, and at least one of said plurality of streams including substantially the same starting scene as the ending scene of another stream to be transmitted in sequence, means for selecting one of said plurality of streams as a next stream to be transmitted to said user terminal in response to a user's input from said user terminal so that said selected stream has substantially the same starting scene as the ending scene of the stream preceding the selected stream, and means for transmitting said selected stream to said user terminal from said server computer so as to display said selected stream in sequence after said preceding stream on said user terminal.

2. The apparatus of claim 1, further including, means of issuing a timing signal for starting the retrieval of a next stream which is selected by said means for selecting in response to said user input if said user input is received by said server computer in time and acceptable for selecting a next stream or which is selected by said server computer. if said user input is not received by said server computer in time or not acceptable for selecting any next stream in order to transmit said selected stream by said means for transmitting.

3. A method of transmitting streams of video data from a server computer to a user terminal for displaying the streams of video data on said user terminal, comprising the steps of:

storing a plurality of streams of video data in said server computer, said plurality of streams being able to be transmitted one by one from said server computer to said user terminal, each of said plurality of streams including a starting scene and an ending scene to be displayed at the beginning of and the ending of each of said streams, respectively, and at least one of said plurality of streams including substantially the same starting scene as the ending scene of another stream, selecting one of said plurality of streams as a next stream to be transmitted to said user terminal in response to a user's input from said user terminal so that said selected stream has substantially the same starting scene is the ending scene of the stream preceding the selected stream, and transmitting said selected stream to said user terminal from said server computer so as to display said selected stream in sequence after said preceding stream on said user terminal.

4. The method of claim 3, further including the step of, issuing a timing signal for the retrieval of a next stream which is selected by said selecting step in response to said user input if said user input is received by said server computer in time and acceptable for selecting a next stream or which is selected by said server computer if said user input is not received by said server computer in time or not acceptable for selecting any next stream in order to transmit said selected stream by said transmitting step.

5. A method of creating a plurality of streams of video data which can be selected and connected in sequence in response to a user's input, comprising the steps of:

(1) taking a motion picture of an object, and simultaneously displaying said motion picture of said object on a display monitor, (2) creating a stream of video data from said motion picture of said object, and storing said stream in a memory, (3) generating a still picture image from an end scene of said stream stored in said memory, (4) superimposing said motion picture of said object being displayed by step 1 on said still picture image generated by step 3 so as to generate a synthesized image of said still picture image generated by step 3 and said motion picture of said object being displayed by step 1 with reversing right-hand and left-hand sides of both said still picture image and said motion picture, (5) displaying said synthesized image on said display monitor in order to register both said still picture image generated by step 3 and said motion picture of said object being displayed by step 1 and, (6) when both said still picture image generated by step 3 and said motion picture of said object being displayed by step 1 are substantially registered each other, starting taking said motion picture of said object by step 1 to create a next stream which can be selected and connected to said end scene of said stream in sequence in response to said user's input.

* * * * *

UNITED STATES PATENT AND TRADEMARK OFFICE
CERTIFICATE OF CORRECTION

PATENT NO.    : 6,470,392 B1
DATED         : October 22, 2002
INVENTOR(S)   : Yotaro Murase and Hidematsu Kasano It is certified that error appears in the above-identified patent and that said Letters Patent is hereby corrected as shown below:

<u>Title page,</u>
Item [75], "Kanagawa-ken (JP)" should read -- Aichi-ken (JP) --

Signed and Sealed this

Nineteenth Day of August, 2003

JAMES E. ROGAN
*Director of the United States Patent and Trademark Office*